United States Patent [19]

Ko

[11] Patent Number: 5,745,452
[45] Date of Patent: Apr. 28, 1998

[54] APPARATUS AND METHOD FOR QUICKLY FOCUSING AN OPTICAL DISK PLAYER

[75] Inventor: Young-san Ko, Kwangmyeong, Rep. of Korea

[73] Assignee: Samsung Electronics Co., Ltd., Kyungki-Do, Rep. of Korea

[21] Appl. No.: 692,130

[22] Filed: Aug. 5, 1996

[30] Foreign Application Priority Data

Aug. 11, 1995 [KR] Rep. of Korea ............ 95-24850

[51] Int. Cl.$^6$ ............................................. G11B 7/095
[52] U.S. Cl. ............................................. 369/44.29; 369/54
[58] Field of Search ........................ 369/44.25, 44.27, 369/44.34–44.35, 54, 44.29; 250/201.5

[56] References Cited

U.S. PATENT DOCUMENTS 5,629,912  5/1997  Okawa et al. ............ 369/44.29
5,642,340  6/1997  Nomura ............ 369/44.25

Primary Examiner—W. R. Young
Attorney, Agent, or Firm—Sughrue, Mion, Zinn, Macpeak & Seas, PLLC

[57] ABSTRACT

An apparatus and method for approaching a focusing region are provided. The apparatus for approaching the focusing region includes a focus error detector, a signal envelope detector, a focusing region detector, a pulse generator for generating search pulses, a time counter, an offset generator, an adder, an actuator driver and a controller. The apparatus approaches the focusing region based on the generating search pulses, which are output in response to a signal generated by the signal envelope detector and a signal output by the focusing region detector. When a subsequent approach to the focusing region is made after finishing a first approach to the focusing region, the actuator is controlled by adding the search pulses to an offset voltage calculated when the first approach to the focusing region was performed to quickly position the object lens in the focusing region.

6 Claims, 5 Drawing Sheets

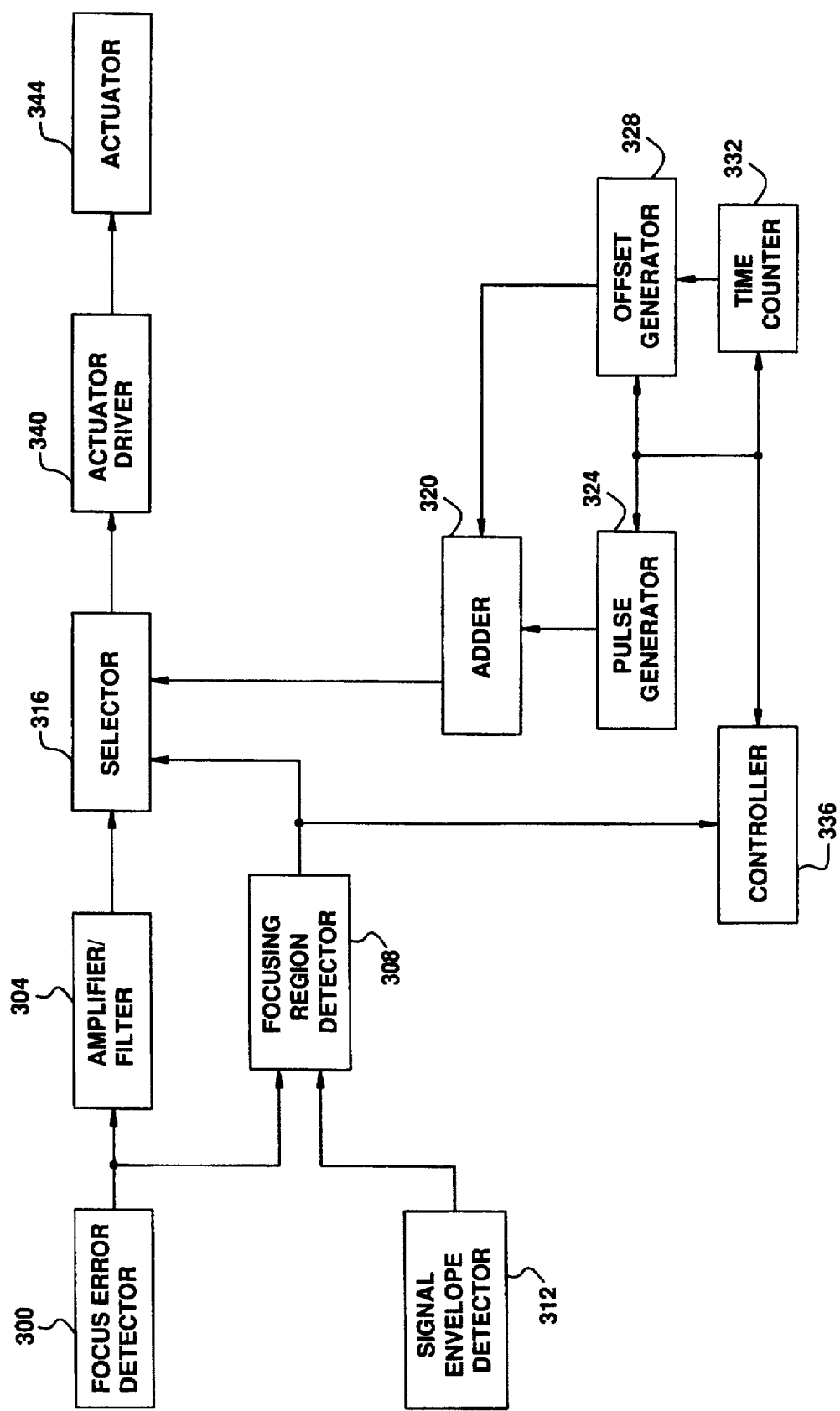

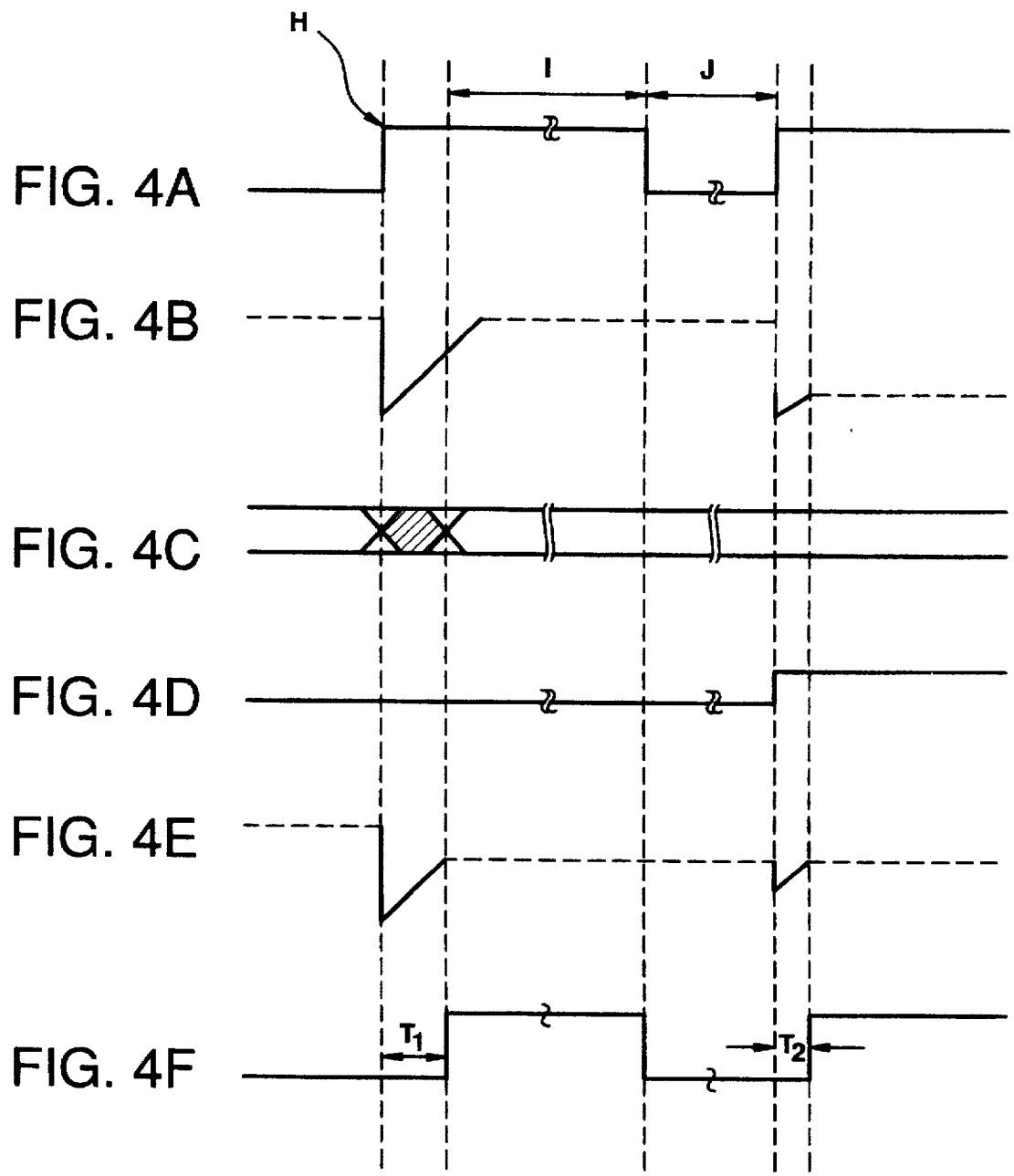

APPARATUS AND METHOD FOR QUICKLY FOCUSING AN OPTICAL DISK PLAYER

BACKGROUND OF THE INVENTION

The present invention relates to the initial control of a focus servo in an optical disk player, and more particularly, to an apparatus that positions an optical lens at a desired focusing position in an optical disk player and a method thereof.

An optical disk player, such as a compact disk (CD) player, cannot accurately pick up information recorded on the signal side of a disk when the signal side of the disk is not focused. Accordingly, the optical disk player requires an apparatus for approaching a focusing region and focusing a servo to the exact position corresponding to the optical focus.

In the conventional method of approaching a focusing region, when the optical disk is played, an object lens first approaches a focusing region, and then a focus servo operation is performed. However, if a replay of the disk is performed after the optical disk stops playing, the focus search is executed in the same manner as the first focus search, thus consuming much time.

SUMMARY OF THE INVENTION

Accordingly, it is an object of the present invention to provide an apparatus for approaching a focusing region in an optical disk to markedly reduce the time required to approach the focusing region by using the offset values calculated when an approach to the focusing region is first performed.

It is another object of the present invention to provide a method for approaching a focusing region in an optical disk to markedly reduce the time required to approach the focusing region by using the offset values calculated when an approach to the focusing region is first performed.

To accomplish the above first object, there is provided an apparatus for approaching the focusing region in an optical disk player comprising a focus error detector for detecting focus errors and outputting a detection signal, a signal envelope detector for detecting a signal envelope and outputting a detection signal, a focusing region detector for detecting the focusing region according to the received output of the focus error detector and the signal envelope detector, a pulse generator for generating search pulses, a time counter for counting the time from the starting point of the search pulses to the finish of the focusing region search, an offset generator for generating an offset voltage according to the counted value output from the time counter, an adder for adding signals output from the pulse generator and the offset generator, an actuator driver for driving an actuator by an output voltage of the adder and a controller for controlling the pulse generator, offset generator and time counter according to the output of the focusing region detector.

To accomplish the above second object, there is provided a method for approaching a focusing region to reduce the approach time to the focusing region in an optical disk player having a time counter which counts time for approaching the focussing region therefor, comprising the steps of: a) determining whether the time counter has a set counted value or not; b) disabling the time counter, converting the set counted value into an offset voltage, and adding search pulses, whose width and peak values have been reduced to a predetermined value, to the offset value when in step a) it is determined that the time counter has the set counted value; c) enabling the time counter and performing counting operation of the time counter until the focusing region is detected, and restoring the search pulse width to its normal width when in the step a) it is determined that the time counter does not have the set counted value; d) approaching the focusing region with the added signal from step b) or the search pulse in the step c) according to the condition determined in step a), e) determining whether the focusing region is detected or not and returning to step d) when the focusing region is not detected; and f) disabling the time counter for finishing the counting operation and finishing the approach to the focusing region when in step e) it is determined that the focusing region is detected.

BRIEF DESCRIPTION OF THE DRAWINGS

The above objects and advantages of the present invention will come more apparent by describing in detail a preferred embodiment thereof with reference to the attached drawings in which:

FIG. 3 is a block diagram illustrating the functional relationship of the components of an apparatus used for a focus search in an optical disk player according to the present invention;

FIG. 4A through FIG. 4F show timing graphs of the apparatus used for a focus search of FIG. 3.

DETAILED DESCRIPTION OF THE INVENTION

Figure 1:
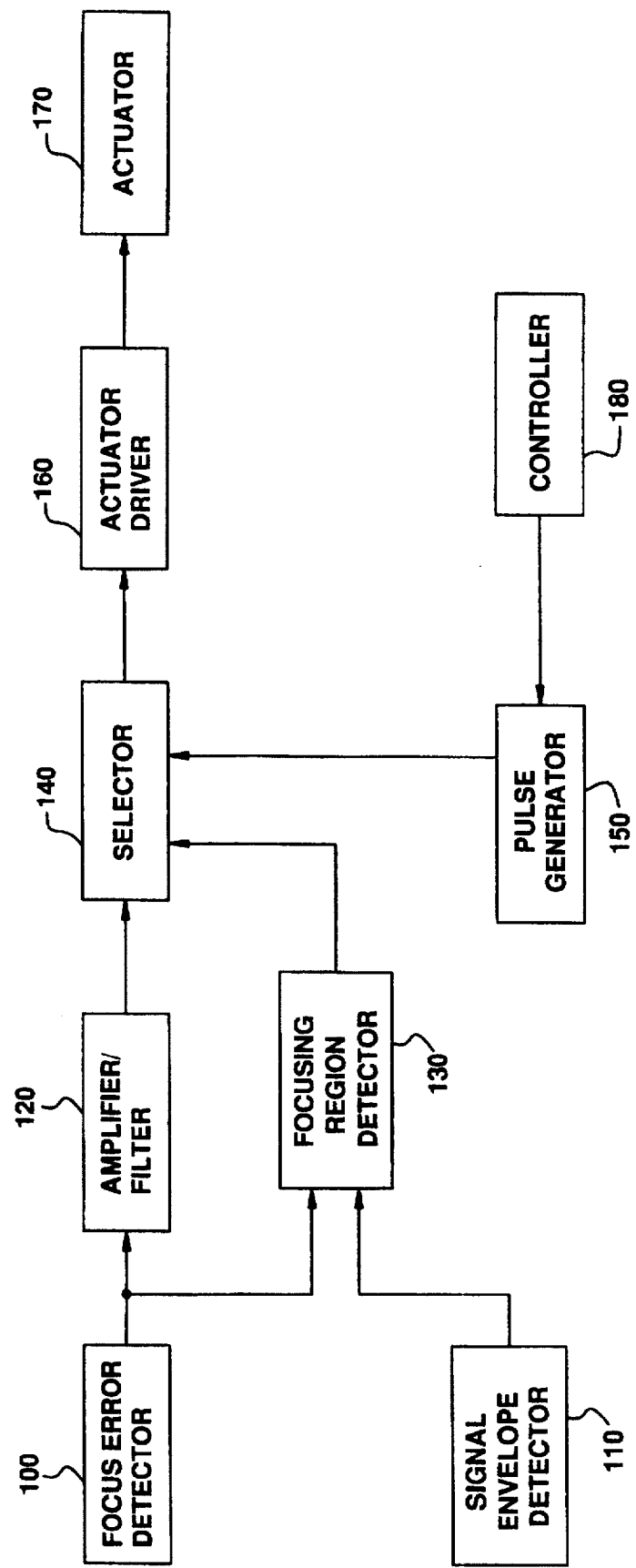
FIG. 1 is a block diagram illustrating the functional relationship of the components of a conventional apparatus for a focus search.

FIG. 1 is a block diagram illustrating the functional relationship of the components of a conventional apparatus used for a focus search. The apparatus for approaching a focusing region shown in FIG. 1 includes a focus error detector 100, a signal envelope detector 110, an amplifier/filter 120, a focusing region detector 130, a selector 140, a pulse generator 150, an actuator driver 160, an actuator 170 and a controller 180.

Referring to FIG. 1, when the optical disk player plays, pulse generator 150 performs the step of approaching the focusing region, in which an object lens (not shown) is positioned in the focusing region by search pulses generated from pulse generator 150. Here, focusing region detector 130 receives the output of focus error detector 100 and signal envelope detector 110 and controls selector 140. When the object lens is not positioned at the desired focusing region, focusing region detector 130 outputs a logic low and supplies it to selector 140. When selector 140 receives the logic low, selector 140 interrupts output signals from amplifier/filter 120. Selector 140 selects search pulses generated by pulse generator 150 according to the servo control signal of controller 180 for outputting the generated search pulses to actuator driver 160. Actuator driver 160 receives the search pulses selected in selector 140 and amplifies the signals for driving actuator 170.

Figure 2A:
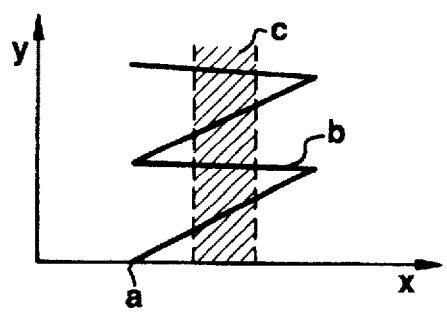
FIG. 2A is a graph of the output of a pulse generator for illustrating operation of an apparatus used for a focus search by a conventional method and according to the present invention.

In FIG. 2A, the x-axis represents the voltage of the search pulses which is proportional to the distance between the object lens and the optical disk and the y-axis represents time. Actuator 170 is supplied with an increasing voltage corresponding to the rise in a search pulse from starting point "a" of FIG. 2A and slowly raises the object lens accordingly. The voltage level of the search pulses peaks at "b." Here, if the object lens fails to approach focusing region "c", the voltage level of the search pulse output by pulse generator 150 is lowered to starting point "a" and the process is repeated until the object lens approaches focusing region "c".

Figure 2B:
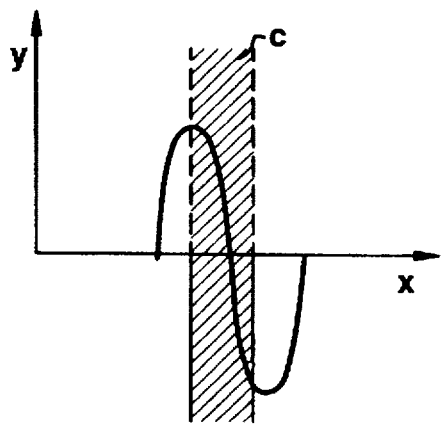
FIG. 2B is a graph of the output of a focus error detector for illustrating operation of an apparatus used for a focus search by a conventional method and according to the present invention.

The above-mentioned process produces an output from focus error detector 100 as shown in FIG. 2B. Here, the x-axis represents the distance between the object lens and the disk and the y-axis represents the focus error voltage. A trace of the voltage level shown in FIG. 2B indicates the voltage level trace output to focusing region detector 130 from focus error detector 100, when the object lens rises from a point below the optical disk. Here, region "c" indicates the focusing region and a position of the optical lens in relation to the optical disk. A focus error voltage of OV corresponds to the exact focus. A signal picked up from a pickup portion (not shown) is supplied to signal envelope detector 130.

Figure 2C:
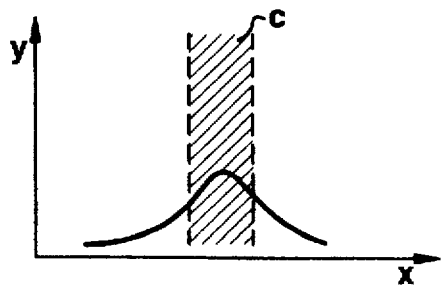
FIG. 2C is a graph of the output of a signal envelope detector for illustrating operation of an apparatus used for a focus search by a conventional method and according to the present invention.

FIG. 2C shows the output of signal envelope detector 110. Here, the x-axis represents the distance between the object lens and the disk and the y-axis represents the signal envelope voltage. The trace of the voltage shown in FIG. 2C corresponds to the distance between the object lens and the disk output from signal envelope detector 110 as the object lens is raised from a bottom point to the optical disk. Here, region "c" indicates the focusing region. The point where the signal envelope voltage peaks represents the position which corresponds to the exact focus.

Focusing region detector 130 receives output signals from focus error detector 100 and signal envelope detector 110 and outputs a control signal to selector 140. When the output voltage of detector 100 is less than a predetermined voltage near OV and the signal envelope voltage of signal envelope detector 110 is at its peak voltage, focusing region detector 130 detects that the object lens is located in the focusing region and outputs a logic high control signal to selector 140.

When the output of the control signal of focusing region detector 130 is logic low, that is, when the object lens is not positioned at the desired focusing region, selector 140 selects the search pulses output from pulse generator 150. The selected search pulses are amplified in actuator driver 160 and supplied to actuator 170 to cause the object lens to enter into the focusing region. When the output of the control signal of focusing region detector 130 is logic high, that is, when the object lens has entered the desired focus region, selector 140 interrupts the output of search pulses from pulse generator 150. Amplifier/filter 120 amplifies the received focus error signal of focus error detector 100 and passes the amplified signal through a filter to prevent oscillation. The focus error signal from amplifier/filter 120 is selected by selector 140 and drives actuator driver 160 to perform a sequential focus servo operation in the focusing region.

FIG. 3 is a block diagram showing an apparatus for a focus search in an optical disk player according to the present invention. FIG. 3 includes a focus error detector 300, an amplifier/filter 304, a focusing region detector 308, a signal envelope detector 312, a selector 316, an adder 320, a pulse generator 324, an offset generator 328, a time counter 332, a controller 336, an actuator driver 340 and an actuator 344.

When power is provided, controller 336 initializes pulse generator 324, offset generator 328 and time counter 332. When the optical disk is played, controller 336 drives pulse generator 324 by supplying a servo control signal. Pulse generator 324 receives the control signal from controller 336, then generates search pulses as shown in FIG. 2A. Controller 336 also supplies the servo control signal to time counter 332. Time counter 332 receives the servo control signal and counts the period of time from the beginning of the search pulses to the detection of the focusing region.

Meanwhile, focusing region detector 308 receives signals output from focus error detector 300 and from signal envelope detector 312 and outputs a control signal to selector 316 to control selector 316. When the object lens is located in a predetermined focusing region, the output voltage of focus error detector 300 is less than a predetermined voltage near OV as shown in region "c" of FIG. 2B and the signal envelope voltage of signal envelope detector 312 outputs the peak voltage shown in FIG. 2C. Here, focusing region detector 308 detects the object lens located in the focusing region and outputs a logic high detection signal to selector 316.

When the output of the detection signal of focusing region detector 308 is a logic low, that is, when the object lens is not located in the desired focusing region, selector 316 selects the search pulses output from pulse generator 324 and outputs the selected search pulses to actuator driver 340 to move the object lens to the focusing region according to the search pulses. When the object lens has entered into the desired focusing region, focusing region detector 308 detects the focusing region and supplies a focusing region detection signal to controller 336. Then the controller 336 supplies a disable signal to time counter 332 to stop the count of time counter 332 and sets a counted value in time counter 332. The counted value in time counter 332 from the start of the approach to the focusing region to the detection of the entry into the focusing region are output to offset generator 328. Then the counted value in offset generator 328 is stored in a memory (not shown) of offset generator 328.

When the counted value of time counter 332 is set, pulse generator 324 outputs search pulses whose width and peak values are reduced to a predetermined value for a quick focus search. When the optical disk resumes play after stopping play, controller 336 reads the set value of time counter 332, then recognizes that a second focus search is being performed. When time counter 332 has a set counted value, controller 336 converts the counted value stored in the memory of offset generator 328 into an offset voltage by controlling a D/A converter (not shown) then outputs the converted offset voltage to adder 320. When the second focus search is performed, adder 320 outputs a search pulse which is a sum of the pulse generated from pulse generator 324 and the offset voltage output from offset generator 328 under the control of controller 336.

Selector 316 selects the output of adder 316 from the starting point of the focus search, then outputs the selected value to actuator driver 340 which amplifies the selected value for application to drive actuator 344. Accordingly, the object lens moves quickly to the starting point of the focusing region by actuator 344, then enters into the desired focusing region.

For subsequent approaches to the focusing region, a conventional apparatus requires the same amount of time as for the initial approach to the focusing region. However, according to the apparatus of the present invention, when the focusing region is detected for the second time, the value counted during the first focus search for detecting the focusing region is converted into an offset voltage through the D/A converter (not shown) in offset generator 328. Then, the search pulses and offset voltage from the starting point of the focus search are added and the object lens quickly moves close to the focusing region in response to the offset voltage. Thereafter, the focus search is begun. Accordingly, the time required for approaching the focusing region can be reduced significantly.

FIGS. 4A through 4F are timing graphs of the apparatus of FIG. 3. FIG. 4A shows a servo control signal output by controller 336 for operating pulse generator 324 and time counter 332, when the optical disk is played. "H" indicates the starting point of the first focus search, "I" represents the time during which the focus servo is operating in the focusing region after detecting the focusing region. "J" represents the time during which the optical disk is temporarily stopped.

FIG. 4B is a view of the search pulses output from pulse generator 324 for performing the focus search. Here, a dashed line shows a high impedance state.

FIG. 4C is a view of the time during which time counter 332 counts and maintains the counted value during Ti, the time period for detecting the focusing region the first time.

FIG. 4D shows an offset voltage output from offset generator 328.

FIG. 4E shows a signal output from adder 320 for adding signals output from pulse generator 324 and offset generator 328. Here, a dashed line shows a high impedance state.

FIG. 4F shows a detecting signal of the focusing region output from focusing region detector 308 when the focusing region is detected.

"T1" indicates the time required for the first search of the focusing region and "T2" indicates the time required for the second search of the focusing region.

As described above, the apparatus according to the present invention performs the second approach to the focusing region by starting from a place near the focusing region by using the offset voltage, thus is able to quickly approach the focusing region. After approaching the focusing region, amplifier/filter 304 amplifies and compensates the phase of error detecting signal output from focus error detector 300 in the focusing region, then the focus error signal is selected in selector 316 and sequentially controlled in actuator 344 to perform the focus servo operation.

Figure 5:
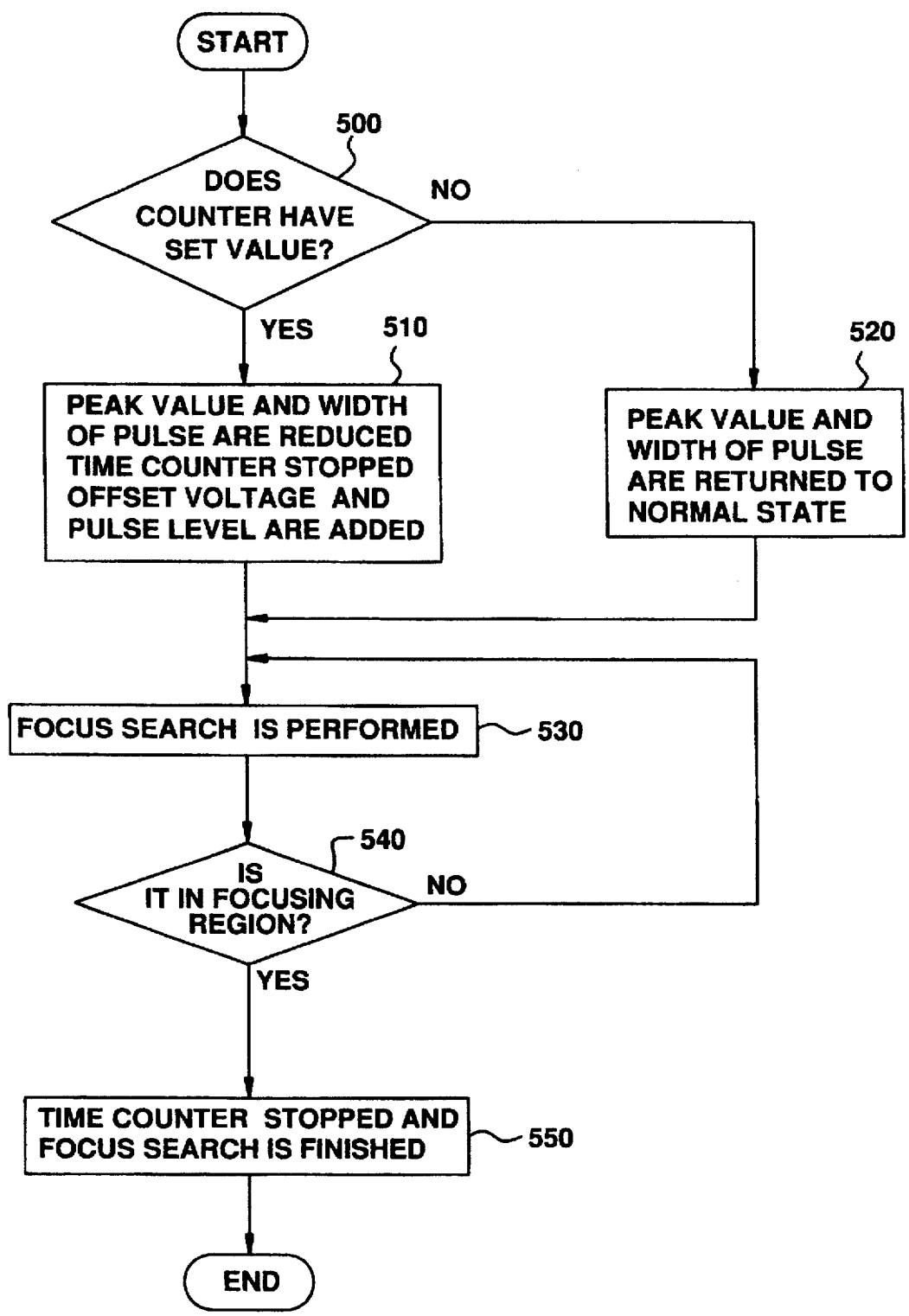
FIG. 5 is a flowchart showing the method for a focus search in the apparatus of FIG. 3.

FIG. 5 is a flowchart showing the method by which the apparatus of FIG. 3 performs a focus search. Step 500 checks whether time counter 332 has a set counted value. If set, time counter 332 is disabled in step 510. The normal width and peak values of the search pulses are reduced to a predetermined value to quickly start the search pulses from the new starting point. The offset generator 328 converts data from the memory where the set counted value from time counter 332 is stored into an offset voltage level.

If time counter 332 does not have a set counted value, step 520 enables time counter 332 and counts the time from 0 to the detection of the focusing region. Pulse generator 324 is controlled to output a search pulse with normal width and peak value. Here, the output level of offset generator 328 is 0.

In step 530, the output of adder 320 is selected from selector 316 and the usual function for approaching the focusing region is performed by driving actuator 344.

In step 540, the focus search region is checked by the detection signal output from focusing region detector 308. If the focusing region is not detected, control returns to step 530 to perform the approach to the focusing region. However, when the focusing region is detected, control proceeds to step 550.

In step 550, time counter 332 is disabled to finish the count and selector 316 interrupts the output of adder 320 to finish the approach to the focusing region.

Thus, according to the apparatus of the present invention for approaching the focusing region, when an approach to the focusing region is performed after finishing a first approach to the focusing region, the actuator is controlled by adding search pulses to offset voltages calculated when the first approach to the focusing region was performed to provide a function which quickly positions the object lens at the focusing region.

What is claimed is:

1. An apparatus for approaching a focusing region in an optical disk player comprising:

a focus error detector for detecting focus errors and outputting a focus error detection signal;

a signal envelope detector for detecting a signal envelope and outputting a signal envelope detection signal;

a focusing region detector for receiving the focus error detection signal and the signal envelope detection signal, detecting the focusing region according to the focus error detection signal and the signal envelope detection signal, and outputting a focusing region detection signal;

a pulse generator for generating search pulses;

a time counter for counting time from a starting point of said search pulses to a finish of said focusing region search and outputting a counted value;

an offset generator for generating an offset voltage according to the counted value output from said time counter;

an adder for adding signals output from said pulse generator and said offset generator and outputting a corresponding voltage;

an actuator driver for driving an actuator according to the voltage output by said adder; and a controller for controlling said pulse generator, offset generator and time counter according to the focusing region detection signal output by said focusing region detector.

2. An apparatus for approaching a focusing region in an optical disk player according to claim 1, wherein said pulse generator reduces the width and peak value of said search pulses to a predetermined value when the counted value in said time counter is set.

3. An apparatus for approaching a focusing region in an optical disk player according to claim 1, wherein said offset generator outputs time data from said time counter as the offset voltage.

4. An apparatus for approaching a focusing region in an optical disk player according to claim 1, wherein said offset generator includes a memory and a D/A converter.

5. An apparatus for approaching a focusing region in an optical disk player according to claim 1 further comprising a selector for interrupting the output of said adder and performing a servo focus operation by selecting the focus error signal output from said focus error detector.

6. A method for approaching a focusing region in an optical disk player having a time counter which counts time for approaching the focusing region, comprising the steps of:

a) determining whether said time counter has a set counted value or not;

b) disabling said time counter, converting said set counted value into an offset voltage, and adding search pulses, whose width and peak values have been reduced to a predetermined value, to said offset value, thereby obtaining an added value, when in said step a) it is determined that said time counter has said set counted value;

c) enabling said time counter and performing a counting operation of said time counter until said focusing region is detected, and restoring said search pulse width to its normal width when in said step a) it is determined that said time counter does not have said set counted value;

d) approaching said focusing region according to either the added signal in said step b) or the search pulse in said step c) depending on the determination made in said step a);

e) determining whether or not said focusing region is detected and returning to said step d) when said focusing region is not detected; and f) disabling said time counter for finishing the counting operation and finishing the approach to the focusing region when in said step e) it is determined that said focusing region is detected.

* * * * *